(No Model.)
W. B. SWARTWOUT.
CAR WHEEL.
No. 369,752. Patented Sept. 13, 1887.
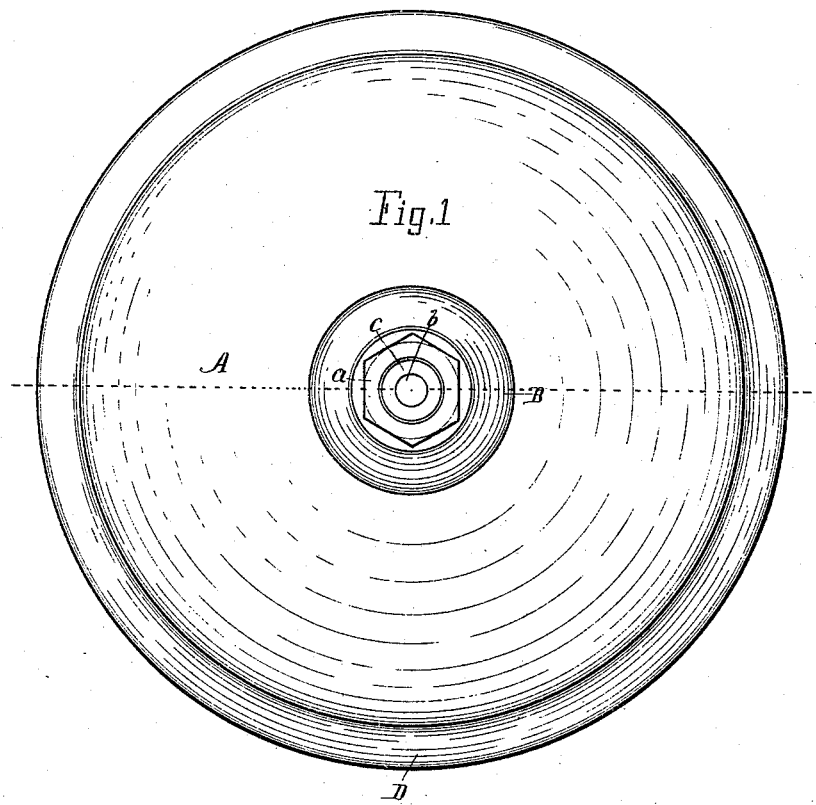
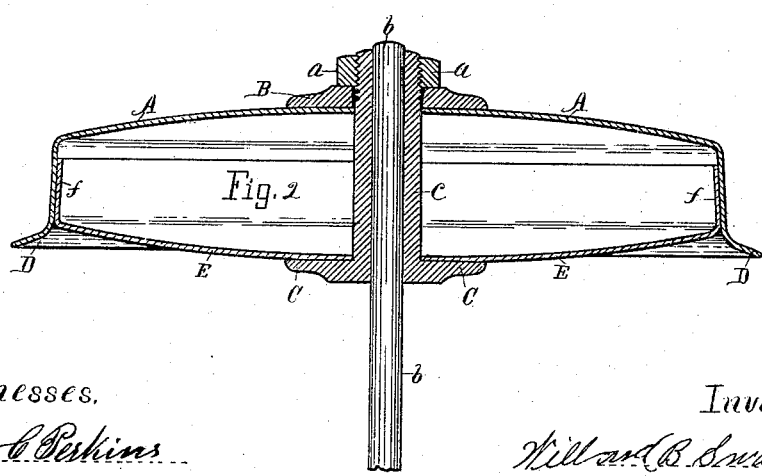
Witnesses.
John C. Perkins
Stephen D. O'Brien
Inventor.
Willard B. Swartwout
By Lucius C. West
atty.

UNITED STATES PATENT OFFICE.

WILLARD B. SWARTWOUT, OF THREE RIVERS, MICHIGAN.

CAR-WHEEL.

SPECIFICATION forming part of Letters Patent No. 369,752, dated September 13, 1887.

Application filed November 23, 1886. Serial No. 219,693. (No model.)

*To all whom it may concern:*

Be it known that I, WILLARD B. SWARTWOUT, a citizen of the United States, residing at Three Rivers, county of St. Joseph, State of Michigan, have invented a new and useful Car-Wheel, of which the following is a specification.

The object of this invention is to effect improvements in "disk-wheels," so called, and hollow wheels, with a view to simplify and cheapen their construction and add to their utility.

To this end the invention, in general terms, consists in a dish-shaped disk bearing the flange of the wheel, all struck or pressed in shape out of one piece of metal, another dish-shaped disk pressed in shape from one piece of metal and detachably and wedgingly shut into the other disk, like a box into its cover, and a suitable hub, upon which the disks are mounted and by which they are detachably held together.

In the drawings forming a part of this specification, Figure 1 is an elevation of the wheel, looking against the end of the axle; and Fig. 2 is a section on the dotted line in Fig. 1.

Referring to the lettered parts of the drawings, A is the metal dish-shaped disk, provided with the flange and tread part of the wheel D, as above stated, struck into shape from one piece of steel plate. The other dish-shaped disk is shown at E, made of a size to snugly shut into the other disk, A, Fig. 2.

It is preferable to make the bottom of the dish-like disks A E concave on the inside, so that both faces of the wheel will be slightly convex, in order that the disks will not unduly press inward when clamped together by the hub. A suitable hub is shown at $c$, having a flanged end, C, to bear against one of the disks, a thread end bearing a clamping-nut, $a$, and a washer, B, to bear against the other disk. Thus by tightening the nut $a$ the disks A E are firmly clamped one within the other, like a box and its cover, the hub, of course, having a hole through it, so as to be mounted on an axle, $b$; but, so far as the hub is concerned, any style may be employed that will serve the purpose of detachably clamping the disks together.

The tread part of the wheel is thoroughly braced and supported by the periphery $f$ of the disk E, which shuts well into the disk A in a wedging manner.

The wheel, as shown in Fig. 2, is composed of only five very simple parts, (including the nut $a$,) easy and cheap to produce, making a light durable wheel, readily put together and taken apart, and not employing a bolt or rivet in its construction.

A wheel thus made of all detachable parts, as described, is distinguishable from and deemed a valuable improvement over hollow car-wheels made in a single piece by welding together two dish-like disks and a hub, as heretofore, in which construction the disks and hub, after the wheel is completed, are not detachable from each other. Besides, in the construction of my wheel I save the expense of a welding forge and machinery and much labor. The disks may be made of any other suitable material.

Having thus described my invention, what I claim as new is—

A wheel composed of two dish-shaped disks, one of which is provided with the tread part and flange and the other shut wedgingly and detachably into it, like a box into its cover, and a hub headed at one end and having a detachable clamping-nut at the other end, the disks being detachably mounted on said hub, all combined substantially as set forth.

In testimony of the foregoing I have hereunto subscribed my name in presence of two witnesses.

WILLARD B. SWARTWOUT.

Witnesses:
WM. O. PEALER,
JOHN COX.